(12) United States Patent
Temple-Wilson (10) Patent No.: US 6,260,856 B1
(45) Date of Patent: Jul. 17, 2001

(54) LOCKING CHUCK

(75) Inventor: Richard E. Temple-Wilson, South Yorkshire (GB)

(73) Assignee: Power Tool Holders Incorporated, Christiana, DE (US)

(*) Notice: Subject to any disclaimer, the term of this patent is extended or adjusted under 35 U.S.C. 154(b) by 0 days.

(21) Appl. No.: 09/441,675

(22) Filed: Nov. 17, 1999

(51) Int. Cl.⁷ ........................................... B23B 31/12
(52) U.S. Cl. ........................ 279/62; 279/140; 279/902
(58) Field of Search ............................ 279/62–65, 140, 279/902

(56) References Cited

U.S. PATENT DOCUMENTS

| | | |
|---|---|---|
| 573,189 | 12/1896 | Vogel . |
| 4,840,387 | 6/1989 | McCarthy . |
| 5,125,673 | 6/1992 | Huff et al. . |
| 5,172,923 | 12/1992 | Nakamura . |
| 5,215,317 | 6/1993 | Jordan et al. . |
| 5,232,230 | 8/1993 | Lin . |
| 5,234,223 | 8/1993 | Sakamaki . |
| 5,261,679 | 11/1993 | Nakamura . |
| 5,322,303 | 6/1994 | Nakamura . |
| 5,348,317 | 9/1994 | Steadings et al. . |
| 5,348,318 | 9/1994 | Steadings et al. . |
| 5,411,275 | 5/1995 | Huff et al. . |
| 5,431,419 | 7/1995 | Mack . |
| 5,458,345 | 10/1995 | Amyot . |
| 5,499,829 | 3/1996 | Rohm . |
| 5,499,830 | 3/1996 | Schnizler . |
| 5,501,473 | 3/1996 | Barton et al. . |
| 5,615,899 | 4/1997 | Sakamaki . |
| 5,741,016 | 4/1998 | Barton et al. . |
| 5,775,704 | 7/1998 | Wilson et al. . |
| 5,816,582 | 10/1998 | Steadings et al. . |
| 5,816,583 | 10/1998 | Middleton . |
| 5,826,888 | 10/1998 | Weaver et al. . |
| 5,913,524 | 6/1999 | Barton . |
| 5,957,469 | 9/1999 | Miles et al. . |

FOREIGN PATENT DOCUMENTS

| | | |
|---|---|---|
| 4238503C1 | 11/1993 | (DE) . |
| 19506708C1 | 3/1996 | (DE) . |
| 296 00 727 U1 | 4/1996 | (DE) . |
| 4438991A1 | 5/1996 | (DE) . |
| 0618029A1 | 10/1994 | (EP) . |
| 0677348A1 | 10/1995 | (EP) . |
| 0710518A2 | 5/1996 | (EP) . |
| 0710519A2 | 5/1996 | (EP) . |
| 0710520A2 | 5/1996 | (EP) . |
| 002645056A | 10/1990 | (FR) . |
| 4365504 | 12/1992 | (JP) . |

Primary Examiner—Steven C. Bishop
(74) Attorney, Agent, or Firm—Nelson Mullins Riley & Scarborough, LLP (57) ABSTRACT

A chuck for use with a manual or powered driver having a rotatable drive shaft includes a pawl having a deflectable burr biased toward a catch in a chuck driver. A chuck sleeve defines a cam surface disposed with respect to the catch and the burr so that the cam surface disengages the burr from the catch when the sleeve is in a first position with respect to the driver and releases the burr to engage the catch, and rotationally fix the pawl to the driver, when the sleeve is in a second position with respect to the driver. The pawl is rotationally fixed to the chuck body when the sleeve is in the second position.

35 Claims, 8 Drawing Sheets

LOCKING CHUCK

BACKGROUND OF THE INVENTION

The present invention relates generally to chucks for use with drills or with electric or pneumatic power drivers. More particularly, the present invention relates to a chuck of the keyless type which may be tightened or loosened by hand or by actuation of the driver motor.

Both hand and electric or pneumatic tool drivers are well known. Although twist drills are the most common tools on such drivers, the tools may also comprise screw drivers, nut drivers, burrs, mounted grinding stones, and other cutting or abrading tools. Since the tool shanks may be of varying diameter or of polygonal cross section, the device is usually provided with a chuck adjustable over a relatively wide range. The chuck may be attached to the driver by a threaded or tapered bore.

A variety of chucks have been developed in the art. In an oblique jawed chuck, a chuck body includes three passageways disposed approximately 120° apart from each other. The passageways are configured so that their center lines meet at a point along the chuck axis forward of the chuck. The passageways constrain three jaws which are movable in the passageways to grip a cylindrical or polygonal tool shank displaced approximately along the chuck center axis. The chuck includes a nut which rotates about the chuck center and which engages threads on the jaws so that rotation of the nut moves the jaws in either direction within the passageways. The body is attached onto the drive shaft of a driver and is configured so that rotation of the body in one direction with respect to the nut forces the jaws into gripping relationship with the tool shank, while rotation in the opposite direction releases the gripping relationship. The chuck may be keyless if it is rotated by hand. One example of such a chuck is disclosed in U.S. Pat. Nos. 5,125,673 and 5,193,824, commonly assigned to the present assignee and the entire disclosures of which are incorporated by reference herein. Various configurations of keyless chucks are known in the art and are desirable for a variety of applications.

SUMMARY OF THE INVENTION

The present invention recognizes and addresses the foregoing considerations, and others, of prior art constructions and methods.

Accordingly, it is an object of the present invention to provide an improved chuck.

This and other objects are achieved by a chuck for use with a manual or powered driver having a rotatable drive shaft. The chuck has a generally cylindrical body having a nose section and a tail section. The tail section is configured to mate with the drive shaft, and the nose section has an axial bore formed therein. A grip is mounted in the body in communication with the axial bore. A generally cylindrical sleeve is rotatably mounted about the body. A driver is mounted about the body and is in operative communication with the grip so that rotation of the driver in a closing direction moves the grip radially toward the bore axis and rotation of the driver in an opening direction moves the grip radially away from the axis. The driver is in operative communication with the sleeve so that the sleeve is rotatable with respect to the driver between a first position and a second position. A pawl is rotatably mounted about the body. The pawl has a deflectable burr biased toward a catch in the driver. The sleeve defines a cam surface disposed with respect to the catch and the burr so that the cam surface disengages the burr from the catch when the sleeve is in the first position with respect to the driver and releases the burr to engage the catch, and rotationally fix the pawl to the driver, when the sleeve is in the second position. The pawl is rotationally fixed to the body when the sleeve is in the second position.

The accompanying drawings, which are incorporated in and constitute a part of this specification, illustrate one embodiment of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments to the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modification and variations as come within the scope of the appended claims and their equivalents.

Figure 1:
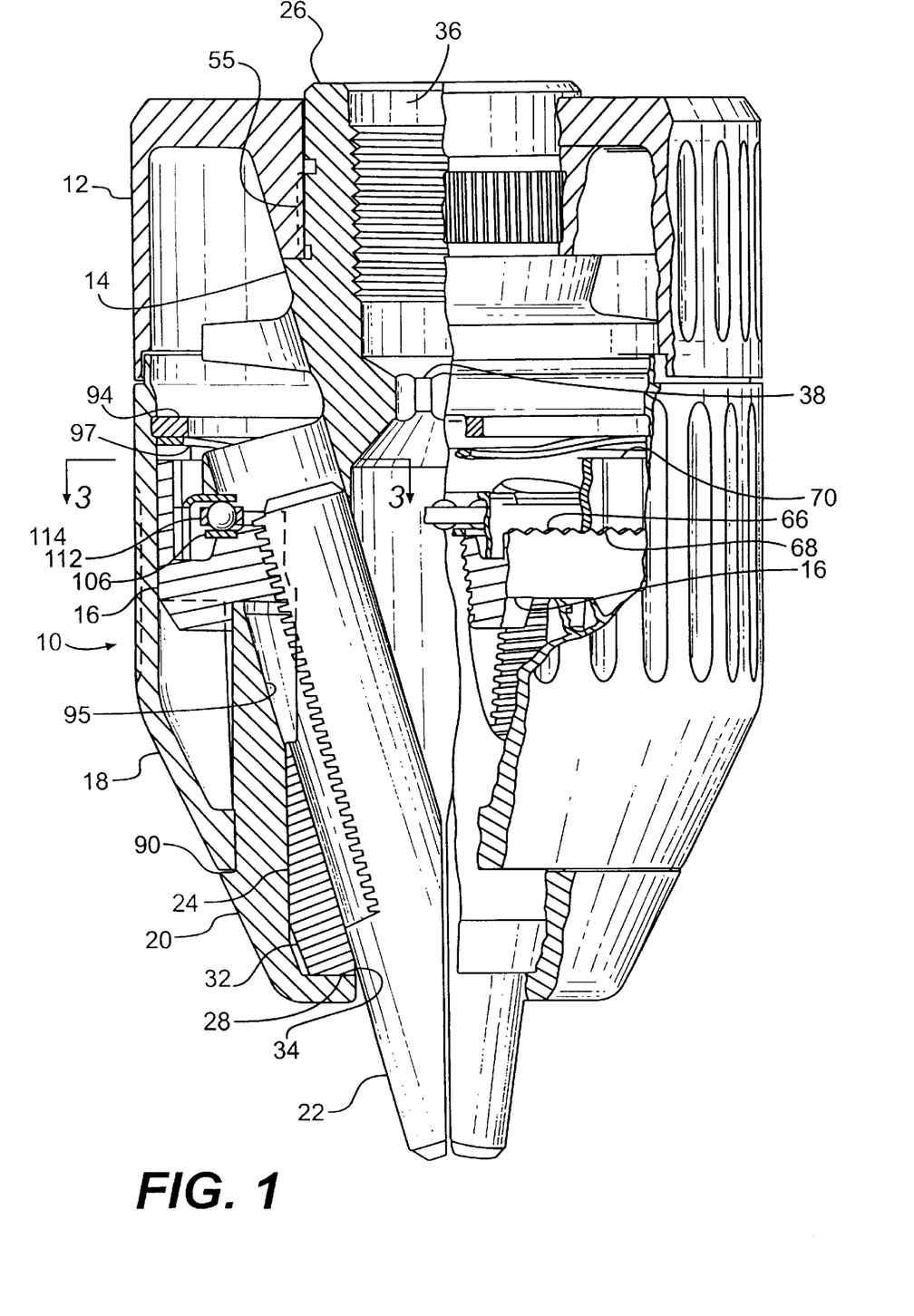
FIG. 1 is a longitudinal view, partly in section, of a chuck in accordance with an embodiment of the present invention.
Figure 2:
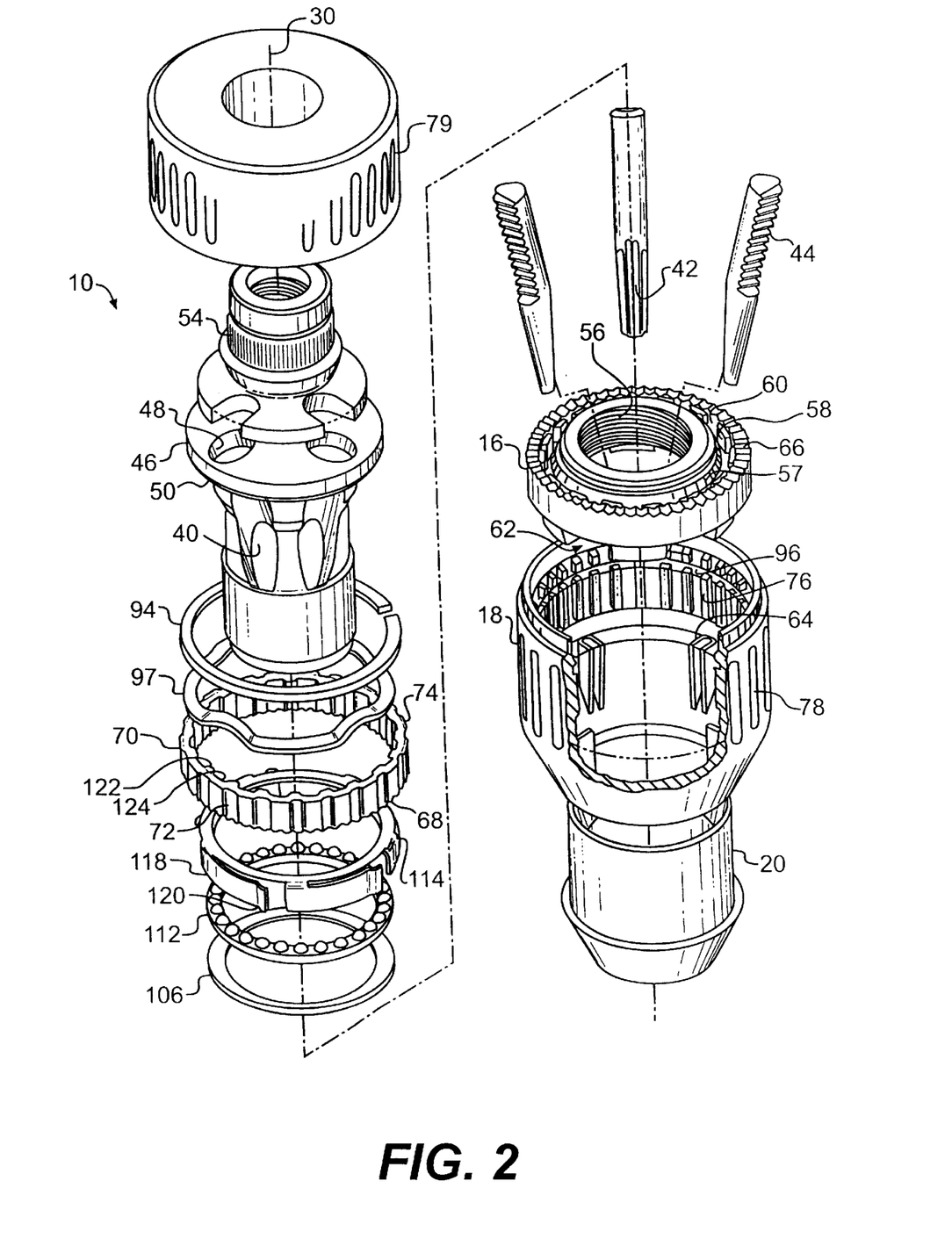
FIG. 2 is an exploded view, partly in section, of a chuck as shown in FIG. 1.

Referring to FIGS. 1 and 2, a chuck 10 includes a body 14, a nut 16, a front sleeve 18, a nose piece 20, and a plurality of jaws 22. Body 14 is generally cylindrical in shape and comprises a nose or forward section 24 and a tail or rearward section 26. Nose section 24 has a front face 28 transverse to the longitudinal center axis 30 of body 14 and a tapered surface 32 at its forward end. The nose section defines an axial bore 34 that is dimensioned somewhat larger than the largest tool shank that the chuck is designed to accommodate. A threaded bore 36 is formed in tail section 26 and is of a standard size to mate with the drive shaft of a powered or hand driver (not shown). The bores 34, 36 may communicate at a central region 38 of body 14. While a threaded bore 36 is illustrated, such bore could be replaced with a tapered bore of a standard size to mate with a tapered drive shaft.

Body 14 defines three passageways 40 to accommodate the three jaws 22. Each jaw is separated from the adjacent jaw by an arc of approximately 120°. The axes of passageways 40 and jaws 22 are angled with respect to the chuck center axis 30 such that each passageway axis travels through axial bore 34 and intersects axis 30 at a common point ahead of the chuck body 14. The jaws form a grip that moves radially toward and away from the chuck axis to grip a tool, and each jaw 22 has a tool engaging face 42 generally parallel to the axis of the chuck body 14. Threads 44, formed on the jaw's opposite or outer surface, may be constructed in any suitable type and pitch.

As illustrated in FIGS. 1 and 2, body 14 includes a thrust ring 46 which, in a preferred embodiment, may be integral with the body 14. It should be understood, however, that thrust ring 46 and body 14 may be separate components. Thrust ring 46 includes a plurality of jaw guideways 48 formed around its circumference to permit retraction of the jaws 22 therethrough and also includes a ledge portion 50 to receive a bearing assembly described below.

Body tail section 26 includes a knurled surface 54 that receives an optional rear sleeve 12 in a press fit at 55. Rear sleeve 12 could also be retained by press fit without knurling, by use of a key or by crimping, staking, riveting, threading, or any other suitable securing mechanism. Further, the chuck may be constructed with a single sleeve having no rear sleeve.

Chuck 10 includes a driver that, in a preferred embodiment, is a one piece nut 16 having threads 56 for mating with jaw threads 44. Nut 16 is positioned about the body in engagement with the jaw threads so that when the nut is rotated with respect to body 14, the jaws will be advanced or retracted depending on the nut's rotational direction.

As illustrated in FIGS. 2–4B, nut 16 defines an inner annular shoulder 57 that in turn defines ridges 58 separated by gaps 60. The nut's forward axial face includes recesses 62 that receive drive dogs 64 extending from the inner surface of front sleeve 18. The angular width of the drive dogs is less than that of the recesses, resulting in a 7.2° range of relative rotational movement between the nut and the front sleeve.

Nut 16 further defines teeth 66 on its rearward axial face that mate with teeth 68 on the forward axial face of a ratchet ring 70. The ratchet ring includes ridges 74 on its outer circumference that interengage with a second set of ridges 76 on the inner circumference of front sleeve 18 so that the front sleeve rotationally drives the ratchet ring. A snap washer 94 received in an annular groove 96 extending through ridges 76 axially retains the ratchet ring in the sleeve. A spring washer 97 between the snap washer and the ratchet ring biases the ratchet ring against the nut so that teeth 66 engage teeth 68. Thus, front sleeve 18 rotationally drives nut 16 through ratchet ring 70.

Nose piece 20 retains nut 16 against forward axial movement. Referring again to FIG. 1, the nose piece is press fit to body nose section 24. It should be understood, however, that other methods of axially securing the nut on the body may be used. For example, the nut may be a two-piece nut held on the body within a circumferential groove on the outer circumference of the body. Nose piece 20 may be coated with a non-ferrous metallic coating to prevent rust and to enhance its appearance. Examples of suitable coatings include zinc or nickel, although it should be appreciated that any suitable coating could be utilized.

The outer circumferential surface of front sleeve 18 may be knurled or may be provided with longitudinal ribs 78 or other protrusions to enable the operator to grip it securely. In like manner, the circumferential surface of rear sleeve 12, if employed, may be knurled or ribbed as at 79 if desired.

Front sleeve 18 is secured from movement in the forward axial direction by an annular shoulder 90 on nose piece 20. A frustoconical section 95 at the rearward end of the nose piece facilitates movement of jaws 22 within the chuck.

The front and rear sleeves may be molded or otherwise fabricated from a structural plastic such as polycarbonate, a filled polypropylene, for example glass filled polypropylene, or a blend of structural plastic materials. Other composite materials such as, for example, graphite filled polymerics may also be suitable in certain environments. As should be appreciated by one skilled in the art, the materials for which the chuck of the present invention is fabricated will depend on the end use of the chuck, and the above materials are provided by way of example only.

When rotation of sleeve 18 tightens jaws 22 onto a tool shank (not shown), further tightening between nut threads 56 and jaw threads 44 creates a rearward axial force that pushes the nut against a load washer 106. The washer transmits the force to a pawl 114 through a caged bearing 112. The force creates a frictional lock between the pawl and a forward axial face of thrust ring 46. Thus, upon tightening of jaws 22 on a tool shank, axial forces between nut 16 and thrust ring 46 rotationally lock pawl 114 to body 14.

The pawl cooperates with the nut and the ratchet ring to rotationally lock the nut to the body when the chuck is in such a fully tightened condition. As shown in FIGS. 2–4B, the ratchet ring and nut define ridges 122 and 58, respectively, on inner circumferential surfaces on either side of interengaging teeth 66 and 68. Gaps 124 separate adjacent ridges 122, while gaps 60 separate adjacent ridges 58. The angular width of ridges 122, ridges 58, gaps 124 and gaps 60 are equal, in one preferred embodiment approximately 7.20°. This is also the angular width of teeth 66 and 68. Thus, when the teeth are fully engaged, ridges 122 and 58 are either fully aligned or fully misaligned with respect to each other.

Figure 4A:
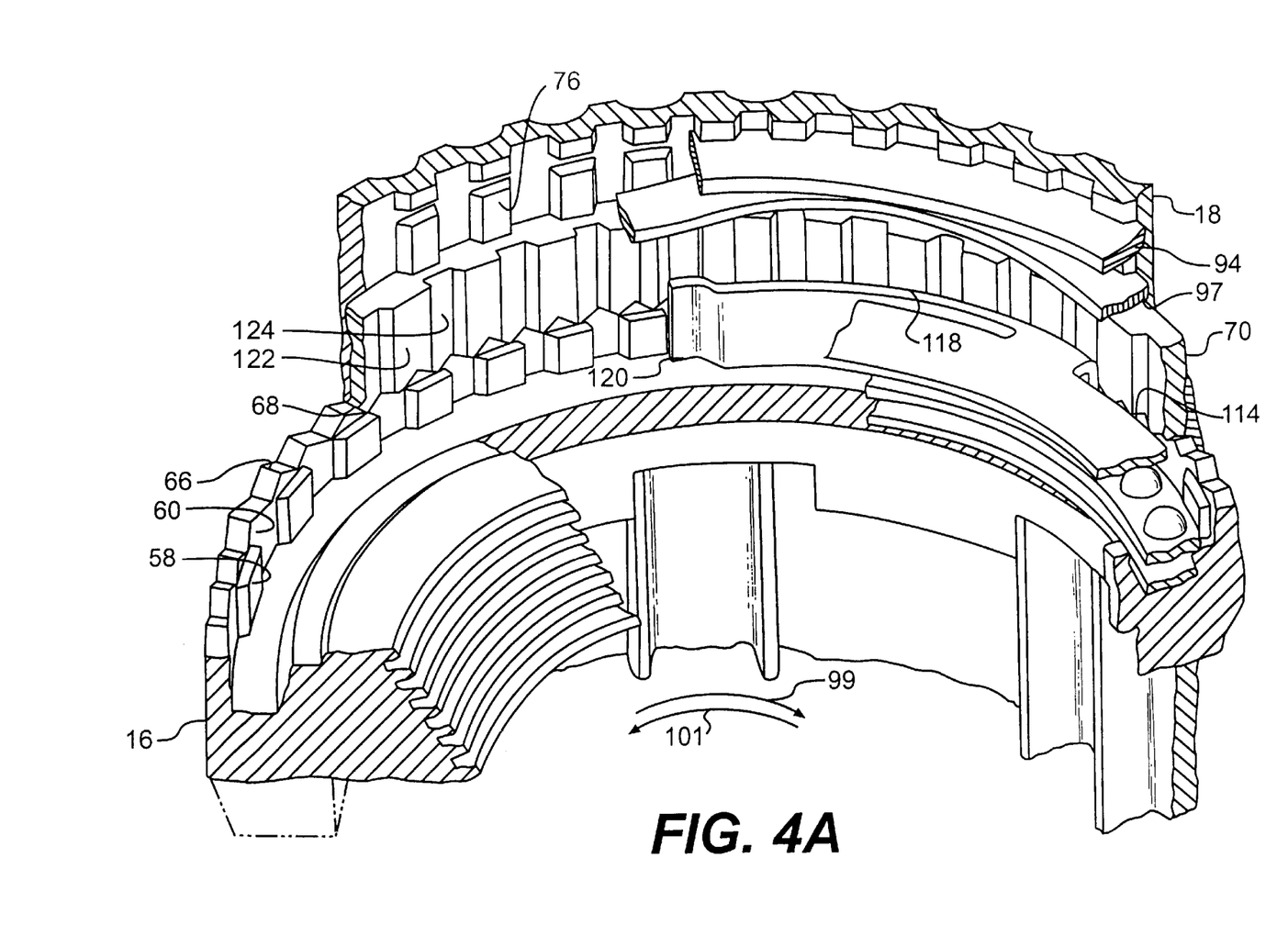
FIG. 4A is a partial elevated perspective view of a chuck as FIGS. 1–3.
Figure 4B:
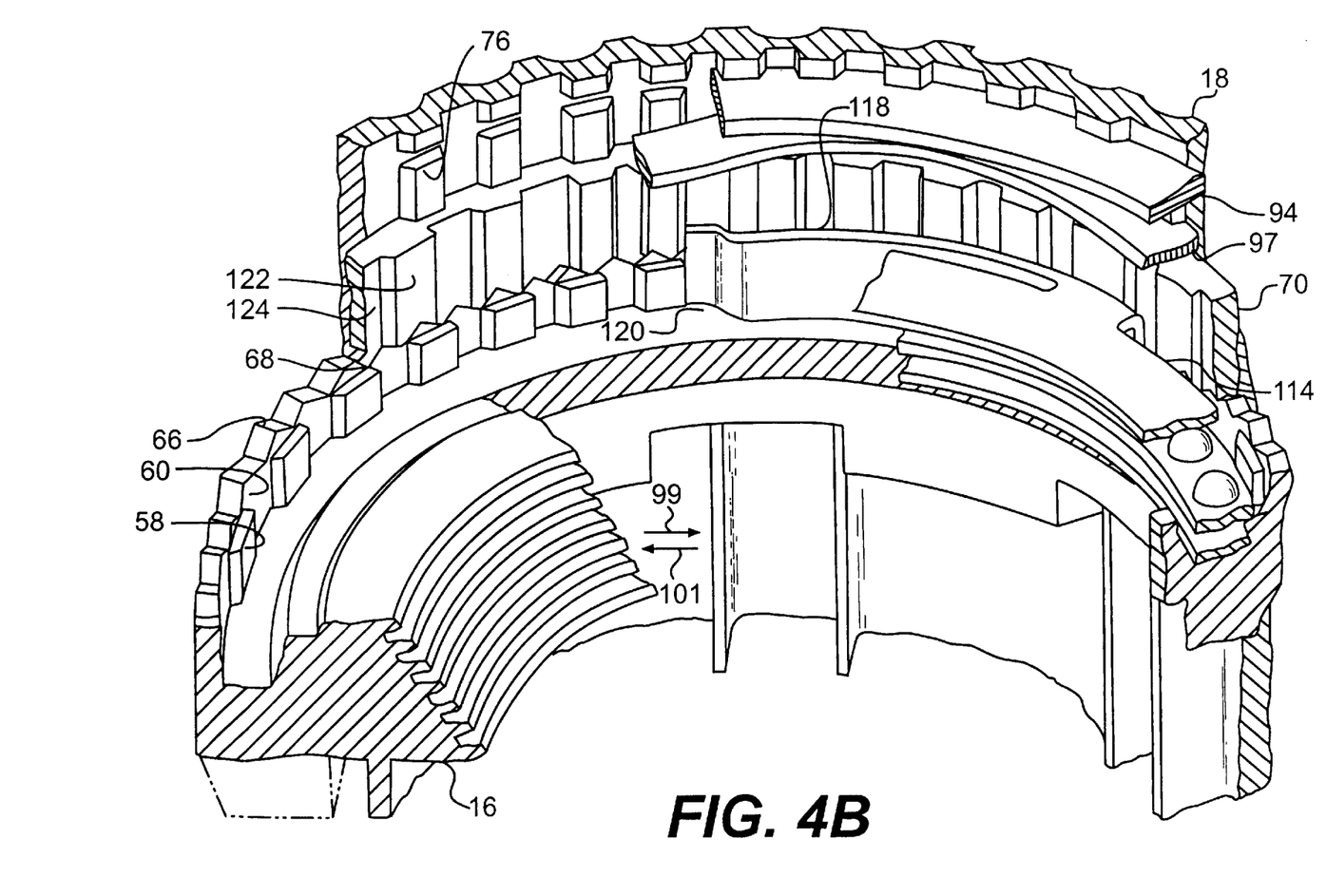
FIG. 4B is a partial elevated perspective view of a chuck as FIGS. 1–3.

FIGS. 4A and 4B illustrate these alternate positions. Referring to FIG. 4A, each ridge 122 in the ratchet ring is axially aligned with a gap 60 in the nut. Each ridge 58 in the nut is, in turn, axially aligned with a gap 124 in the ratchet ring. In FIG. 4B, ridges 122 axially align with ridges 58, while gaps 124 align with gaps 60.

Figure 5:
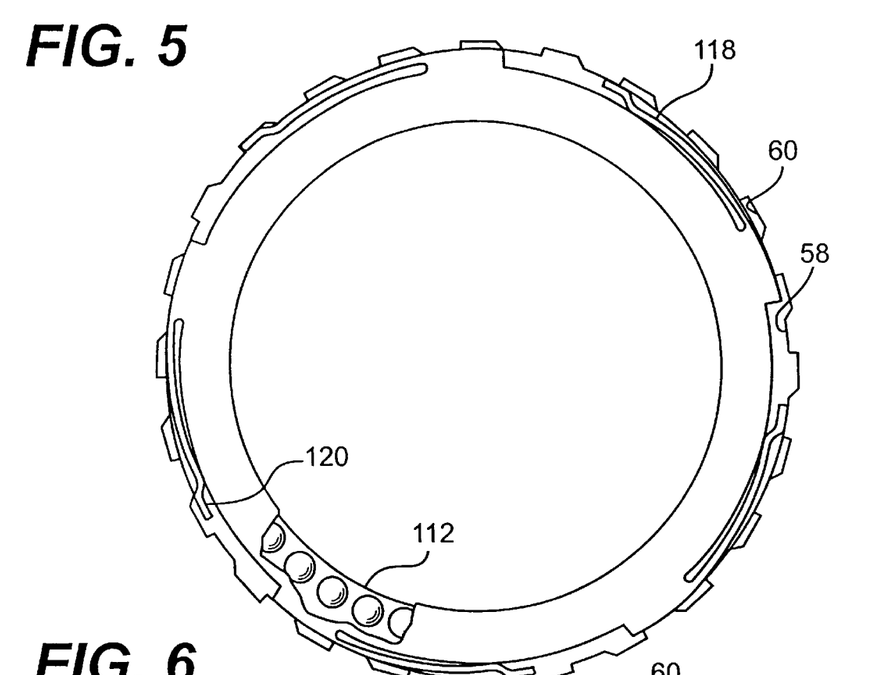
FIG. 5 is a partial cut away view of a pawl, a bearing and a nut within a chuck in accordance with one preferred embodiment of the present invention.
Figure 6:
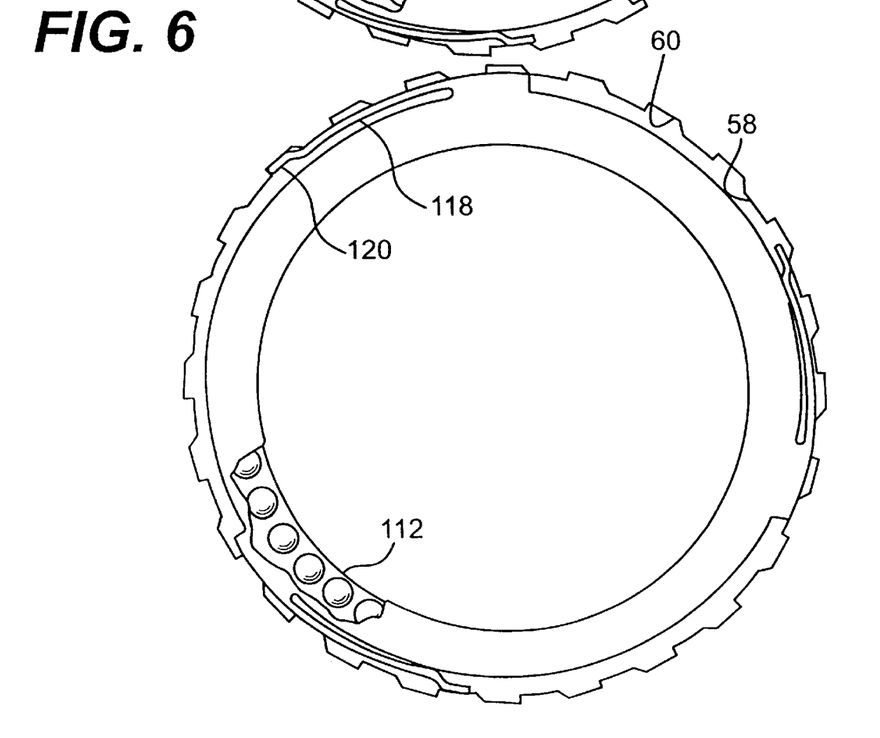
FIG. 6 is a partial cut away view of a pawl, a bearing and a nut within a chuck in accordance with one preferred embodiment of the present invention.

Pawl arms 118 are biased radially outward so that burrs 120 engage the inner circumferential surfaces of the nut and ratchet ring that define the ridges and gaps. As shown in FIGS. 5 and 6, the pawl includes multiple arms (for example, five or three as respectively shown in the figures) that are spaced apart so that one burr will always be sufficiently radially aligned with a nut gap 60 so that it could enter and engage the gaps. That is, the burr is disposed with respect to the gap so that it could move radially into the gap if there were no obstacles to such movement. The other burrs engage ridges 58 at various points.

Figure 3:
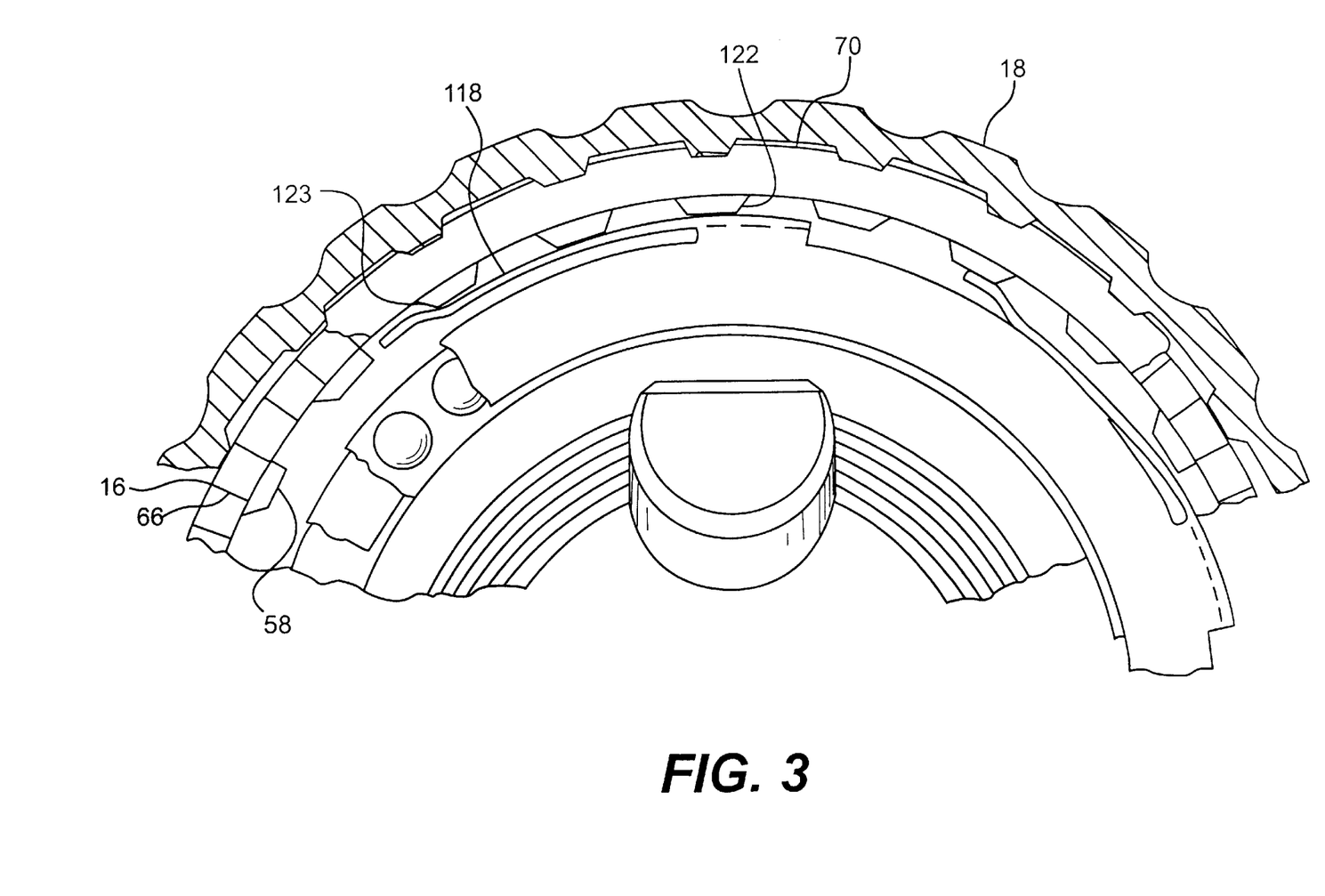
FIG. 3 is a cross-sectional view, partly in section, of a chuck as shown in FIG. 1, taken along lines 3,3.

Referring again to FIG. 4A, however, even the burr that is sufficiently radially aligned with a gap 60 cannot engage the gap when the ridges 58 and 122 are misaligned. That is, the burr engages a ridge 122 that prevents the burr from engaging the gap 60 with which it is radially aligned. When the ratchet ring shifts to the alternate position with respect to the nut, as shown in FIG. 4B, the gap 60 is aligned with a gap 124, thereby allowing the burr to move into and engage the gap 60. This condition is also illustrated in FIG. 3. The nut gap is then a catch that prevents relative rotation between the nut and the pawl.

In operation, when the chuck is between a fully opened and fully closed position, the ratchet ring and nut are aligned as shown in FIG. 4A. Spring 97 biases the ratchet ring against the nut so that teeth 66 and 68 engage. Thus, an operator rotating sleeve 18 rotationally drives the nut through the ratchet ring, thereby opening or closing the jaws. During this rotation, when the jaws have not yet closed on a tool shank, the pawl rotates with the ratchet ring and nut about the body due to the frictional engagement of burrs 120 with the ridges 122 and 58.

When the sleeve, ratchet ring and nut are rotated in the closing direction (indicated at arrow 99 in FIG. 4A) to the point that the jaws tighten onto a tool shank, the threaded engagement between the jaws and the nut resists the nut's further rotation. As described above, the resulting rearward axial force presses the pawl against the body thrust ring so that friction between the thrust ring and the pawl resists the pawl's rotation as well. However, due to a clutch (comprised of spring 97 and teeth 66 and 68) that operates between the ratchet ring and the nut, and to the 7.2° rotational gap between drive dogs 64 and recesses 62, sleeve 18 and ratchet ring 70 may continue to rotate. As the sleeve is rotated, teeth 68 ride over the sloped sides of teeth 66, pushing ratchet ring 70 back against the biasing force of spring 97. Once teeth 66 pass over the center of teeth 68, the spring pushes the ratchet ring back into engagement with the nut as shown in FIG. 4B. At this point, drive dogs 64 abut the opposite side faces of recesses 62, preventing further rotation of the sleeve and ratchet ring relative to the nut. As described above, ratchet ring gaps 124 are now aligned with nut gaps 60, and the burr that is radially aligned with a gap 60 is allowed to move into the gap as shown in FIG. 3. Since the frictional lock between the pawl and the thrust ring rotationally fixes the pawl to the body, and since the burr that engages the nut gap 60 rotationally fixes the nut to the pawl, the nut is rotationally locked to the body. This resists undesirable rotation between the nut and the body during use of the chuck.

To open the chuck, the operator rotates sleeve 18 in the opening direction (indicated by arrow 101 in FIG. 4B). The force applied by spring 97 between teeth 66 and 68 is insufficient to overcome the lock between the nut threads and jaw threads, and teeth 68 ride back over teeth 66 so that the ratchet ring slides back against spring 97 on ridges 76 until returning to the position with respect to nut 16 shown in FIG. 4A. Referring also to FIG. 3, a cam surface 123 on a leading edge of a ridge 122 pushes the one burr 120 that is received in a nut gap 60 out of the gap so that all burrs 120 again ride on ridges 58 and/or 122. With the rotation of sleeve 18 and ratchet ring 70, drive dogs 64 move to the other side of recesses 62, as shown in FIG. 4A. The drive dogs now abut the forward faces, with respect to the opening direction 101, of recesses 62, and the nut must thereafter move with the sleeve in the opening direction. Further opening rotation of the sleeve therefore releases the nut from its lock with the jaw threads. The sleeve, nut and pawl then rotate together as described above between the fully opened and fully closed positions until the jaws again close on a tool.

Figure 7:
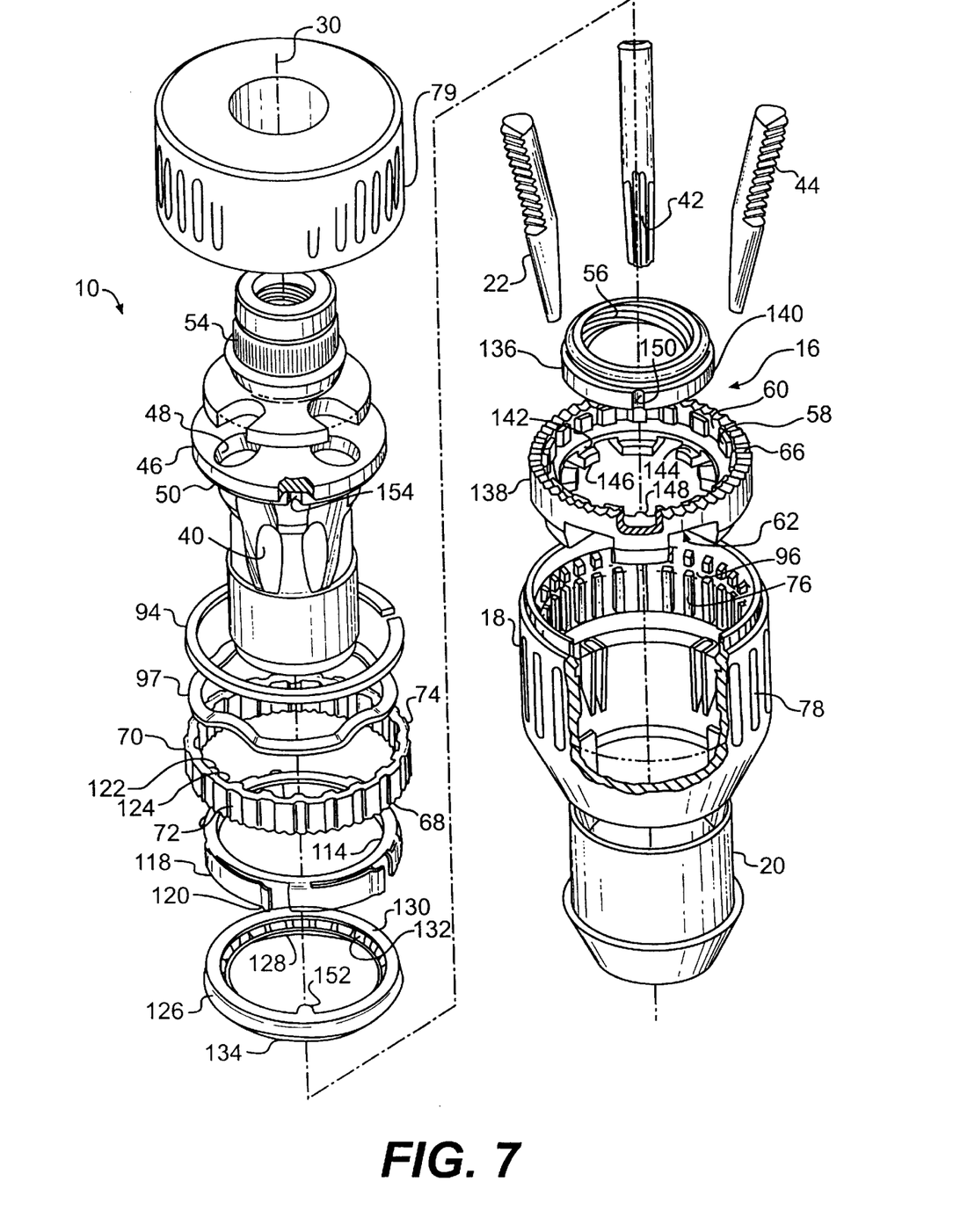
FIG. 7 is an exploded view, partly in section, of a chuck in accordance with an embodiment of the present invention.
Figure 8:
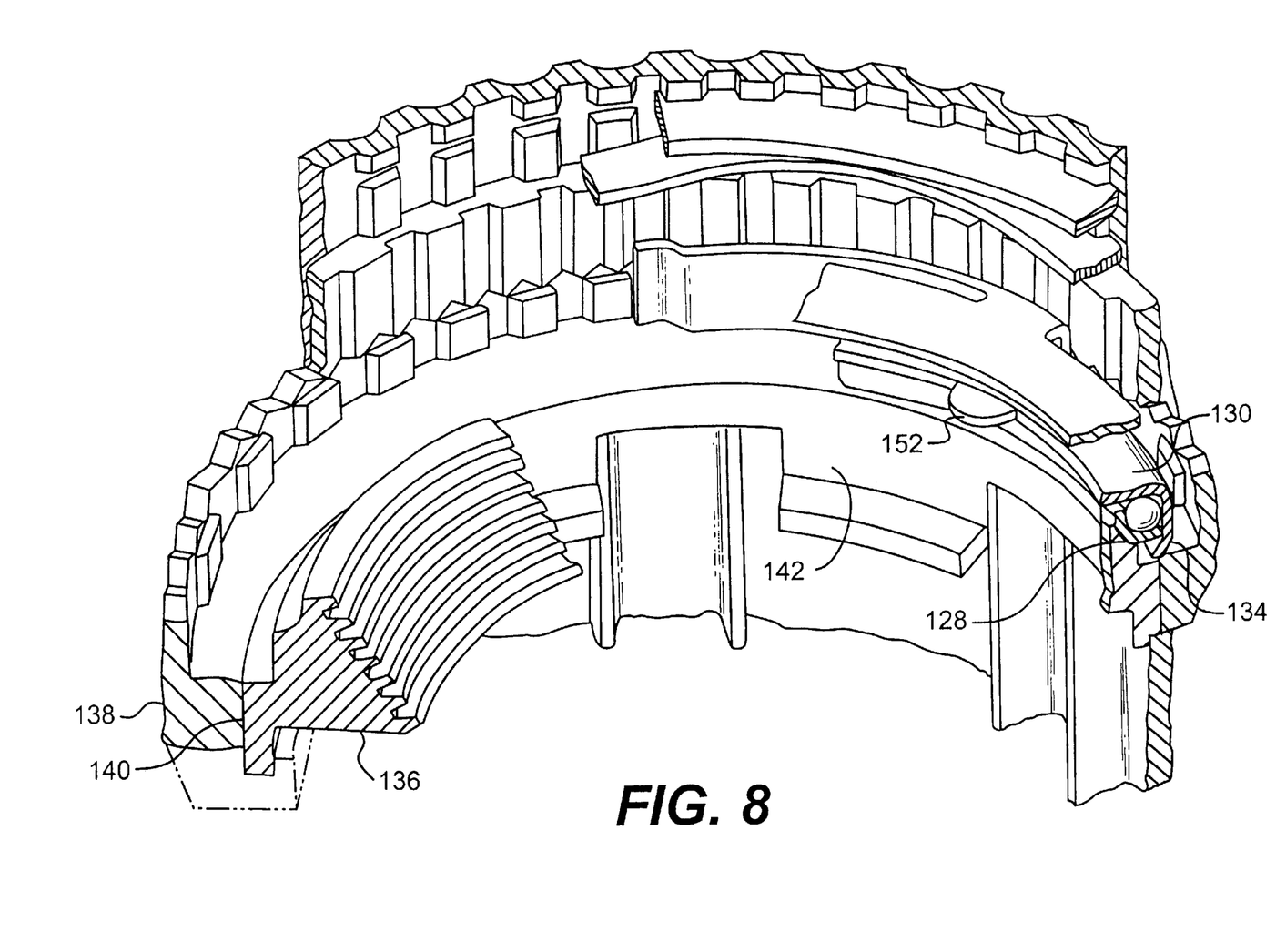
FIG. 8 is a partial elevated perspective view of a chuck as in FIG. 7.

In another preferred embodiment of the present invention shown in FIGS. 7 and 8, a bearing 126 replaces the washer 106 and caged bearing 112 as shown in FIG. 2. Bearing 126 includes an inner race 128, an outer race 130 and bearing elements 132 maintained therebetween. In a preferred embodiment, bearing elements 132 are ball bearings. Outer race 130 includes an inwardly angled shoulder 134 that retains inner race 128 and bearing elements 132 together with the outer race. It should be understood that various suitable bearing constructions, for example as disclosed in U.S. Pat. No. 5,348,318, incorporated by reference herein, may be used within the present invention.

Nut 16 is composed of two coaxial segments 136 and 138. Segment 138 defines teeth 66, ridges 58 and gaps 60 as discussed above. Segment 136 defines nut threads 56. Segment 138 receives segment 136 so that an outer circumferential surface 140 of segment 136 fits within an inner circumferential surface 142 of segment 138. Segment 136 is retained in the forward axial direction with respect to segment 138 by an annular surface 144 defined by a plurality of tabs 146 at the forward end of segment 138. Segment 136 is rotationally fixed to segment 138 by a tab 148 that extends radially inward from inner circumferential surface 142 and that is received by a groove 150 defined in outer circumferential surface 140 of segment 136. Accordingly, segment 136 may move axially, but not rotationally, with respect to segment 138.

Outer race 130 of bearing 126 includes a tab 152 that extends radially inward from the race's inner circumferential surface. The tab forms a key that is received in a groove 154 defined in ledge portion 50 of thrust ring 46. Thus, the key rotationally fixes outer race 130 with respect to the body while permitting the bearing's axial movement. Such movement facilitates transmission of rearward force from nut segment 136 to the pawl.

Accordingly, when jaws 22 tighten onto a tool shank, the jaws exert a rearward axial force against nut segment 136. The axial play between segments 136 and 138 facilitate transmission of this force to bearing 126. The bearing, in turn, transfers the force to the pawl, and outer race 130 captures the pawl in a frictional lock between itself and thrust ring ledge portion 50.

While one or more preferred embodiments of the present invention have been described above, it should be understood that any and all equivalent realizations of the present invention are included within the scope and spirit thereof. For example, while the embodiment illustrated in the figures is an oblique-jawed chuck, it should be understood that the chuck may include any suitable construction. Thus the depicted embodiments are presented by way of example only and are not intended as limitations on the present invention. It should be understood that aspects of the various one or more embodiments may be interchanged both in whole or in part. Therefore, it is contemplated that any and all such embodiments are included in the present invention as may fall within the literal or equivalent scope of the appended claims.

What is claimed is:

1. A chuck for use with a manual or powered driver having a rotatable drive shaft, said chuck comprising:
   a generally cylindrical body member having a nose section and a tail section, said tail section being configured to mate with said drive shaft and said nose section having an axial bore formed therein;
   a grip mounted in said body member in communication with said axial bore;

a generally cylindrical sleeve rotatably mounted about said body member;

a driver mounted about said body member and in operative communication with said grip so that rotation of said driver in a closing direction moves said grip radially away from said axis, wherein said driver is in operative communication with said sleeve so that said sleeve is rotatable with respect to said driver between a first position and a second position; and a pawl having a deflectable burr biased toward a catch in said driver, wherein said sleeve defines a cam surface disposed with respect to said catch and said burr so that said cam surface disengages said burr from said catch when said sleeve is in said first position with respect to said driver and releases said burr to engage said catch, and rotationally fix said pawl to said driver, when said sleeve is in said second position with respect to said driver, and wherein said pawl is rotationally fixed to said body when said sleeve is in said second position.

2. A chuck for use with a manual or powered driver having a rotatable drive shaft, said chuck comprising:

a generally cylindrical body member having a nose section and a tail section, said tail section being configured to mate with said drive shaft and said nose section having an axial bore formed therein;

a grip mounted in said body member in communication with said axial bore;

a generally cylindrical sleeve rotatably mounted about said body member;

a driver mounted about said body member and in operative communication with said grip so that rotation of said driver in a closing direction moves said grip radially toward the axis of said bore and rotation of said driver in an opening direction moves said grip radially away from said axis, wherein said driver is in operative communication with said sleeve so that said sleeve is rotatable with respect to said driver over a limited arc between a first position and a second position; and a plurality of first ridges defined in a first annular surface of said sleeve and separated by a plurality of respective first gaps;

a plurality of second ridges defined in a second annular surface of said driver and separated by a plurality of respective second gaps, wherein said second annular surface is proximate said first annular surface so that said first ridges and said first gaps are aligned with said second gaps and said second ridges, respectively, when said sleeve is in said first position with respect to said driver and said first ridges and said first gaps are aligned with said second ridges and said second gaps, respectively, when said sleeve is in said second position with respect to said driver; and a pawl rotatably mounted about said body member, wherein said pawl has a plurality of deflectable burrs biased toward said first and second annular surfaces and wherein said deflectable burrs are spaced apart so that at least one said burr is radially aligned with a said second gap, and at least one other said burr is radially aligned with a said second ridge, regardless of the rotational orientation of said pawl with respect to said driver, wherein said driver is configured so that, when said grip closes against said tool and said sleeve is rotated in said closing direction, said driver resists further rotation and said sleeve moves from said first position to said second position so that said at least one burr is received in a said second gap to rotationally lock said driver to said body member.

3. The chuck as in claim 2, wherein said grip includes a plurality of jaws.

4. The chuck as in claim 3, wherein said nose section includes a plurality of angularly disposed passageways formed therethrough and intersecting said axial bore of said nose section, and wherein a separate one of said jaws is slidably positioned in each one of said passageways.

5. The chuck as in claim 4, wherein each of said jaws has a jaw face formed on one side thereof and threads formed on an opposite side thereof, and said driver includes an annular nut having threads formed thereon in engagement with said threads on said jaws so that rotation of said nut about said body moves said jaws axially in said passageways.

6. The chuck as in claim 5, wherein said first annular surface is defined by an inner circumferential surface of said sleeve and wherein said second annular surface is defined by an inner circumferential surface of said nut that is axially adjacent to said first annular surface.

7. The chuck as in claim 5, wherein said nut defines at least one gap having a first angular width and said sleeve defines at least one drive dog received by said gap and having a second angular width that is less than said first angular width to permit movement of said sleeve with respect to said nut between said first position and said second position.

8. A chuck for use with a manual or powered driver having a rotatable drive shaft, said chuck comprising:

a generally cylindrical body member having a nose section and a tail section, said tail section being configured to mate with said drive shaft and said nose section having an axial bore formed therein;

a grip mounted in said body member in communication with said axial bore;

a generally cylindrical sleeve rotatably mounted about said body member;

a driver mounted about said body member and in operative communication with said grip so that rotation of said driver in a closing direction moves said grip radially toward the axis of said bore and rotation of said driver in an opening direction moves said grip radially away from said axis, wherein said driver is in operative communication with said sleeve so that said sleeve is rotatable with respect to said driver over a limited arc between a first position and a second position;

a clutch coupling said sleeve and said driver so that said driver rotates with said sleeve with respect to said body member, wherein said clutch slips upon receiving sufficient rotational resistance from said driver so that said sleeve is rotatable with respect to said driver between said first position and said second position; and a pawl having a deflectable burr biased toward a catch in said driver, wherein said sleeve defines a cam surface disposed with respect to said catch and said burr so that said cam surface disengages said burr from said catch when said sleeve is in said first position with respect to said driver and releases said burr to engage said catch, and rotationally fix said pawl to said driver, when said sleeve is in said second position with respect to said driver, and wherein said pawl is rotationally fixed to said body when said sleeve is in said second position.

9. The chuck as in claim 8, wherein said grip includes a plurality of jaws.

10. The chuck as in claim 9,
wherein said nose section includes a plurality of angularly disposed passageways formed therethrough and intersecting said axial bore of said nose section, and
wherein a separate one of said jaws is slidably positioned in each one of said passageways.

11. The chuck as in claim 8, including a gripping surface disposed about said tail section, wherein said gripping surface is rotationally fixed to said tail section and is rotatable with respect to said sleeve.

12. The chuck as in claim 8, wherein said clutch includes a toothed interface between said driver and said sleeve and a spring that engages one of said driver and said sleeve and biases teeth defined by said one of said driver and said sleeve toward teeth defined by the other of said driver and said sleeve.

13. The chuck as in claim 12, wherein said sleeve includes a generally cylindrical main portion and an annular ring rotationally fixed to said main portion and wherein said sleeve teeth are formed on said ring.

14. The chuck as in claim 13, wherein said ring is axially movably engaged with said with said main portion, and wherein said spring is operatively disposed between said sleeve and said ring to bias said teeth on said ring toward engagement with said teeth on said driver.

15. The chuck as in claim 14, wherein said driver is retained on said body member by an annular retainer having a generally cylindrical forward section pressed to said nose section of said body member and an engagement section rearward of said forward section and in engagement with said driver.

16. The chuck as in claim 10, wherein said driver includes an annular nut having threads on its inner diameter that mate with said threads on said jaws so that rotation of said nut about said body member move said jaws axially in said passageways.

17. The chuck as in claim 16, including an annular retainer having a generally cylindrical forward section pressed to said nose section of said body member and a frustoconical section extending rearwardly from said generally cylindrical portion and engaging said driver.

18. The chuck as in claim 8, wherein said sleeve includes a plurality of said cam surfaces spaced apart annularly about an inner circumferential surface of said sleeve, wherein said driver includes a plurality of said catches spaced apart annularly about an inner circumferential surface of said driver that is axially adjacent said inner circumferential surface of said sleeve.

19. The chuck as in claim 18, including a plurality of first gaps respectively disposed between adjacent said cam surfaces and wherein said catches are comprised of a plurality of second gaps respectively disposed between adjacent ridges of a plurality of said ridges extending radially inward from said inner circumferential surface of said driver.

20. The chuck as in claim 19, wherein said burr bears against a said cam surface, and is disposed over a said second gap, when said sleeve is in said first position, and wherein said burr is received by a said first gap and a said second gap when said sleeve is in said second position.

21. The chuck as in claim 19, wherein the angular width of each said cam surface, said ridge, said first gap and said second gap is approximately equal.

22. The chuck as in claim 19,
wherein each said cam surface is axially aligned with a respective one of said second gaps, and each said first gap is axially aligned with a respective one of said ridges, when said sleeve is in said first position,
wherein each said cam surface is axially aligned with a respective one of said ridges, and each said first gap is axially aligned with a respective one of said second gaps, when said sleeve is in said second position, and
wherein said burr is radially aligned with one of said second gaps when said sleeve is in said first position and when said sleeve is in said second position.

23. The chuck as in claim 19, wherein said pawl includes a plurality of radially deflectable burrs spaced apart about said body member and biased radially outward toward said inner circumferential surfaces of said driver and said sleeve, and wherein said burrs are spaced apart so that at least one said burr must be radially aligned with a said second gap, and at least one other said burr must be radially aligned with a said ridge, regardless of the rotational orientation of said pawl with respect to said driver.

24. A chuck for use with a manual or powered driver having a rotatable drive shaft, said chuck comprising:
a generally cylindrical body member having a nose section and a tail section, said tail section being configured to mate with said drive shaft and said nose section having an axial bore formed therein and a plurality of angularly disposed passageways formed therethrough and intersecting said axial bore of said nose section;
a plurality of jaws, a separate one of said jaws being slidably positioned in one of each of said angularly disposed passageways, each of said jaws having a jaw face formed on one side thereof and threads formed on the opposite side thereof;
a generally cylindrical sleeve rotatably mounted about said body member;
a nut rotatably mounted about said body member and in engagement with said threads on said jaws so that rotation of said nut with respect to said body moves said jaws axially in said passageways, wherein said nut is in operative communication with said sleeve so that said sleeve is rotatable with respect to said nut over a limited arc between a first position and a second position, wherein said sleeve rotationally drives said nut through respective sets of interengaging teeth on said nut and said sleeve, and wherein one of said nut and said sleeve is axially movable with respect to said body member away from the other of said nut and said sleeve;
a spring biasing said one of said nut and said sleeve toward said other of said nut and said sleeve, wherein sides of opposing said interengaging teeth are angled so that, upon sufficient rotational resistance between said nut and said sleeve, said interengaging teeth slip over each other against said bias of said spring, and said nut and said sleeve rotate with respect to each other between said first position and said second position;
a plurality of first ridges defined in a first annular surface of said sleeve and separated by a plurality of respective first gaps;
a plurality of second ridges defined in a second annular surface of said nut and separated by a plurality of respective second gaps, wherein said second annular surface is proximate said first annular surface so that said first ridges and said first gaps are aligned with said second gaps and said second ridges, respectively, when said sleeve is in said first position with respect to said nut and said first ridges and said first gaps are aligned with said second ridges and said second gaps, respectively, when said sleeve is in said second position with respect to said nut; and a pawl rotatably mounted about said body member between said nut and said body member so that said pawl is pressed against said body member by said nut when said jaws close against a tool disposed in said axial bore, wherein said pawl has a plurality of deflectable burrs biased toward said first and second annular surfaces and wherein said deflectable burrs are spaced apart so that at least one said burr must be radially aligned with a said second gap, and at least one other said burr must be radially aligned with a said second ridge, regardless of the rotational orientation of said pawl with respect to said nut so that said pawl is rotationally held to said nut by said at least one other burr.

25. The chuck as in claim 24, wherein said first annular surface is defined by a circumferential surface of said sleeve, and said second annular surface is defined by a circumferential surface of said nut.

26. The chuck as in claim 24, wherein said first annular surface is defined by an inner circumferential surface of said sleeve, and said second annular surface is defined by an inner circumferential surface of said nut.

27. The chuck as in claim 24, wherein said sleeve includes a generally cylindrical main portion and an annular ring rotationally fixed to said main portion and wherein said sleeve teeth are formed on said ring, said ring is axially movably engaged with said with said main portion, and said spring is operatively disposed between said sleeve and said ring to bias said teeth on said ring toward engagement with said teeth on said nut.

28. A chuck for use with a manual or powered driver having a rotatable drive shaft, said chuck comprising:

a generally cylindrical body member having a nose section and a tail section, said tail section being configured to mate with said drive shaft and said nose section having an axial bore formed therein;

a grip mounted in said body member in communication with said axial bore;

a generally cylindrical sleeve rotatably mounted about said body member;

a driver mounted about said body member and in operative communication with said grip so that rotation of said driver in a closing direction moves said grip radially toward the axis of said bore and rotation of said driver in an opening direction moves said grip radially away from said axis;

a clutch coupling said sleeve and said driver so that said driver rotates with said sleeve with respect to said body member, wherein said driver is in operative communication with said sleeve so that said sleeve is rotatable with respect to said driver over a limited arc between a first position and a second position, and wherein said clutch slips upon receiving sufficient rotational resistance from said driver so that said sleeve is rotatable with respect to said driver between said first position and said second position;

a plurality of first ridges defined in a first annular surface of said sleeve and separated by a plurality of respective first gaps;

a plurality of second ridges defined in a second annular surface of said driver and separated by a plurality of respective second gaps, wherein said second annular surface is proximate said first annular surface so that said first ridges and said first gaps are aligned with said second gaps and second ridges, respectively, when said sleeve is in said first position with respect to said driver and said first ridges and said first gaps are aligned with said second ridges and said second gaps, respectively, when said sleeve is in said second position with respect to said driver; and a pawl rotatably mounted about said body member between said driver and said body member so that said pawl is pressed against said body member by said driver when said grip closes against a tool disposed in said axial bore, wherein said pawl has a plurality of deflectable burrs biased toward said first and second annular surfaces, wherein said deflectable burrs are spaced apart so that at least one said burr must be radially aligned with a said second gap, and at least one other said burr must be radially aligned with a said second ridge, regardless of the rotational orientation of said pawl with respect to said driver, wherein said driver is configured so that, when said grip closes against said tool, said driver resists further rotation in said closing direction, and wherein said driver is configured so that, when said grip closes against said tool and said sleeve is rotated in said closing direction, said driver resists further rotation and said sleeve moves from said first position to said second position so that said at least one burr is received in a said second gap to rotationally lock said driver to said body member.

29. A chuck for use with a manual or powered driver having a rotatable drive shaft, said chuck comprising:

a generally cylindrical body member having a nose section and a tail section, said nose section having an axial bore formed therein and a plurality of angularly disposed passageways formed therethrough and intersecting said axial bore;

a plurality of jaws, a separate one of said jaws being slidably positioned in one of each of said passageways, each of said jaws having a jaw face formed on one side thereof and threads formed on the opposite side thereof;

a nut mounted rotatably about, and axially reciprocally with respect to, said body member and in engagement with said threads on said jaws so that rotation of said nut with respect to said body moves said jaws axially in said passageways; and a pawl rotatably mounted about said body member and having a deflectable burr biased toward a catch that is rotationally fixed to one of said body member and said nut, wherein said pawl is disposed between said nut and said body member so that, when said jaws tighten on a tool shank, said nut transfers axial force from said jaws to said body member through said pawl so that said pawl is rotationally locked to the other of said body member and said nut.

30. The chuck as in claim 29, including a bearing disposed between said pawl and said one of said body member and said nut.

31. The chuck as in claim 30, wherein said bearing includes a race that abuts said pawl and that is rotationally fixed to said one of said body member and said nut.

32. The chuck as in claim 31, wherein
said bearing is disposed between said pawl and nut, and
said bearing race defines a radially inwardly extending tab that is received in an axial groove defined in said body member.

33. The chuck as in claim 29, wherein said nut includes an outer segment and an inner segment concentric with said outer segment, said inner segment defining said nut threads and being received by said outer segment so that said inner segment is axially reciprocal, and rotationally fixed, with respect to said outer segment.

34. The chuck as in claim 5, wherein said nut includes an outer segment and an inner segment concentric with said outer segment, said inner segment defining said nut threads and being received by said outer segment so that said inner segment is axially reciprocal, and rotationally fixed, with respect to said outer segment.

35. The chuck as in claim 16, wherein said nut includes an outer segment and an inner segment concentric with said outer segment, said inner segment defining said nut threads and being received by said outer segment so that said inner segment is axially reciprocal, and rotationally fixed, with respect to said outer segment.

* * * * *